US012518490B2

(12) United States Patent
Mahalingam et al.

(10) Patent No.: US 12,518,490 B2
(45) Date of Patent: Jan. 6, 2026

(54) WRIST ROTATION MANIPULATION OF VIRTUAL OBJECTS

(71) Applicant: Snap Inc., Santa Monica, CA (US)

(72) Inventors: Anoosh Kruba Chandar Mahalingam, Sunnyvale, CA (US); Jennica Pounds, Cape Coral, FL (US); Andrei Rybin, Lehi, UT (US); Pierre-Yves Santerre, Bellevue, WA (US)

(73) Assignee: Snap Inc., Santa Monica, CA (US)

( * ) Notice: Subject to any disclaimer, the term of this patent is extended or adjusted under 35 U.S.C. 154(b) by 308 days.

(21) Appl. No.: 17/823,814

(22) Filed: Aug. 31, 2022

(65) Prior Publication Data

US 2024/0070995 A1 Feb. 29, 2024

(51) Int. Cl.
| | |
|---|---|
| G06T 19/00 | (2011.01) |
| G02B 27/01 | (2006.01) |
| G06F 3/01 | (2006.01) |
| G06T 19/20 | (2011.01) |
| G06V 20/20 | (2022.01) |
| G06V 40/20 | (2022.01) |

(52) U.S. Cl.
CPC ........ G06T 19/006 (2013.01); G02B 27/0172 (2013.01); G06F 3/017 (2013.01); G06T 19/20 (2013.01); G06V 20/20 (2022.01); G06V 40/28 (2022.01); *G02B 2027/0178* (2013.01)

(58) Field of Classification Search
CPC ....... G06T 19/006; G06T 19/20; G06V 40/28; G06V 20/20; G02B 27/0172; G02B 2027/0178; G06F 3/017
See application file for complete search history.

(56) References Cited

U.S. PATENT DOCUMENTS

| | | | |
|---|---|---|---|
| 7,971,156 B2 | 6/2011 | Albertson et al. | |
| 7,996,793 B2 | 8/2011 | Latta et al. | |
| 8,487,938 B2 | 7/2013 | Latta et al. | |

(Continued)

FOREIGN PATENT DOCUMENTS

| | | |
|---|---|---|
| CN | 103049761 | 8/2016 |
| CN | 119790365 A | 4/2025 |

(Continued)

OTHER PUBLICATIONS

O'Hagan, Rochelle, and Alexander Zelinsky. "Visual gesture interfaces for virtual environments." Proceedings First Australasian User Interface Conference. AUIC 2000 (Cat. No. PR00515). IEEE, 2000. (Year: 2000).*

(Continued)

*Primary Examiner* — Geoffrey E Summers
(74) *Attorney, Agent, or Firm* — Schwegman Lundberg & Woessner, P.A.

(57) ABSTRACT

An Augmented Reality (AR) system is provided. The AR system uses a combination of gesture and DMVO methodologies to provide for the user's selection and modification of virtual object of an AR experience. The user indicates that they want to interact with a virtual object of the AR experience by moving their hand to overlap the virtual object. While keeping their hand in an overlapping position, the user rotates their wrist and the virtual object is rotated as well. To end the interaction, the user moves their hand such that their hand is no longer overlapping the virtual object.

17 Claims, 10 Drawing Sheets

(56) References Cited

U.S. PATENT DOCUMENTS

| | | |
|---|---|---|
| 8,856,691 B2 | 10/2014 | Geisner et al. |
| 9,225,897 B1 | 12/2015 | Sehn et al. |
| 9,230,160 B1 | 1/2016 | Kanter |
| 9,276,886 B1 | 3/2016 | Samaranayake |
| 9,705,831 B2 | 7/2017 | Spiegel |
| 9,742,713 B2 | 8/2017 | Spiegel et al. |
| 10,102,423 B2 | 10/2018 | Shaburov et al. |
| 10,284,508 B1 | 5/2019 | Allen et al. |
| 10,439,972 B1 | 10/2019 | Spiegel et al. |
| 10,509,466 B1 | 12/2019 | Miller et al. |
| 10,514,876 B2 | 12/2019 | Sehn |
| 10,579,869 B1 | 3/2020 | Xiong et al. |
| 10,591,730 B2 | 3/2020 | Rodriguez, II et al. |
| 10,614,855 B2 | 4/2020 | Huang |
| 10,748,347 B1 | 8/2020 | Li et al. |
| 10,958,608 B1 | 3/2021 | Allen et al. |
| 10,962,809 B1 | 3/2021 | Castañeda |
| 10,996,846 B2 | 5/2021 | Robertson et al. |
| 10,997,787 B2 | 5/2021 | Ge et al. |
| 11,012,390 B1 | 5/2021 | Al Majid et al. |
| 11,030,454 B1 | 6/2021 | Xiong et al. |
| 11,036,368 B1 | 6/2021 | Al Majid et al. |
| 11,062,498 B1 | 7/2021 | Voss et al. |
| 11,087,728 B1 | 8/2021 | Canberk et al. |
| 11,092,998 B1 | 8/2021 | Castañeda et al. |
| 11,106,342 B1 | 8/2021 | Al Majid et al. |
| 11,126,206 B2 | 9/2021 | Meisenholder et al. |
| 11,143,867 B2 | 10/2021 | Rodriguez, II |
| 11,169,600 B1 | 11/2021 | Canberk et al. |
| 11,227,626 B1 | 1/2022 | Krishnan Gorumkonda et al. |
| 11,307,747 B2 | 4/2022 | Dancie et al. |
| 11,531,402 B1 | 12/2022 | Stolzenberg |
| 11,546,505 B2 | 1/2023 | Canberk |
| 11,798,201 B2 | 10/2023 | Eirinberg et al. |
| 2009/0012788 A1 | 1/2009 | Gilbert et al. |
| 2011/0301934 A1 | 12/2011 | Tardif |
| 2013/0285903 A1 | 10/2013 | Langridge et al. |
| 2014/0171036 A1 | 6/2014 | Simmons |
| 2014/0240225 A1* | 8/2014 | Eilat ............... G06F 3/011 345/156 |
| 2015/0120293 A1 | 4/2015 | Wohlert et al. |
| 2015/0370320 A1 | 12/2015 | Connor |
| 2017/0123487 A1 | 5/2017 | Hazra et al. |
| 2017/0277684 A1 | 9/2017 | Dharmarajan Mary |
| 2017/0277685 A1 | 9/2017 | Takumi |
| 2017/0351910 A1 | 12/2017 | Elwazer et al. |
| 2018/0158370 A1 | 6/2018 | Pryor |
| 2018/0217680 A1 | 8/2018 | Sudou et al. |
| 2019/0146219 A1 | 5/2019 | Rodriguez, II |
| 2019/0310716 A1 | 10/2019 | Sinha et al. |
| 2019/0362562 A1 | 11/2019 | Benson |
| 2021/0011612 A1 | 1/2021 | Dancie et al. |
| 2021/0074016 A1 | 3/2021 | Li et al. |
| 2021/0096726 A1* | 4/2021 | Faulkner ............ G06F 3/04883 |
| 2021/0166732 A1 | 6/2021 | Shaburova et al. |
| 2021/0174034 A1 | 6/2021 | Retek et al. |
| 2021/0241529 A1 | 8/2021 | Cowburn et al. |
| 2021/0263593 A1 | 8/2021 | Lacey |
| 2021/0303075 A1 | 9/2021 | Cowburn et al. |
| 2021/0303077 A1 | 9/2021 | Anvaripour et al. |
| 2021/0303140 A1 | 9/2021 | Mourkogiannis |
| 2021/0382564 A1 | 12/2021 | Blachly et al. |
| 2021/0397000 A1 | 12/2021 | Rodriguez, II |
| 2021/0405761 A1 | 12/2021 | Canberk |
| 2022/0103748 A1 | 3/2022 | Canberk |
| 2022/0188539 A1 | 6/2022 | Chan et al. |
| 2022/0206588 A1 | 6/2022 | Canberk et al. |
| 2022/0300730 A1 | 9/2022 | Eirinberg et al. |
| 2022/0300731 A1 | 9/2022 | Eirinberg et al. |
| 2022/0326781 A1 | 10/2022 | Hwang et al. |
| 2022/0334649 A1 | 10/2022 | Hwang et al. |
| 2022/0375174 A1 | 11/2022 | Arya et al. |
| 2023/0038709 A1 | 2/2023 | Ramani et al. |
| 2023/0090410 A1* | 3/2023 | Sharma ............... G06F 3/167 345/633 |
| 2023/0195236 A1 | 6/2023 | Sun |
| 2023/0259215 A1* | 8/2023 | Fashimpaur ........ G06T 19/006 |
| 2023/0343052 A1* | 10/2023 | Kimura ................. G06T 19/20 |
| 2023/0359268 A1* | 11/2023 | Letkeman ........... G06F 3/0304 |
| 2024/0385690 A1 | 11/2024 | Spong |

FOREIGN PATENT DOCUMENTS

| | | |
|---|---|---|
| EP | 3707693 | 9/2020 |
| EP | 4172726 | 5/2023 |
| EP | 4172730 | 5/2023 |
| KR | 20220158824 | 12/2022 |
| WO | 2016168591 | 10/2016 |
| WO | 2019094618 | 5/2019 |
| WO | 2022005687 | 1/2022 |
| WO | 2022005693 | 1/2022 |
| WO | 2022066578 | 3/2022 |
| WO | 2022060549 | 4/2022 |
| WO | 2022132381 | 6/2022 |
| WO | 2022146678 | 7/2022 |
| WO | 2022198182 | 9/2022 |
| WO | 2022216784 | 10/2022 |
| WO | 2022225761 | 10/2022 |
| WO | 2022245765 | 11/2022 |
| WO | 2024050263 | 3/2024 |

OTHER PUBLICATIONS

Boukhayma, Adnane, Rodrigo de Bem, and Philip HS Torr. "3D Hand Shape and Pose From Images in the Wild." 2019 IEEE/CVF Conference on Computer Vision and Pattern Recognition (CVPR). IEEE, 2019. (Year: 2019).*

Rahman, Mahfuz, et al. "Tilt techniques: investigating the dexterity of wrist-based input." Proceedings of the SIGCHI conference on human factors in computing systems. 2009. (Year: 2009).*

Piumsomboon, Thammathip. "Natural Hand Interaction for Augmented Reality." 2015. Univ. of Canterbury, PhD dissertation. (Year: 2015).*

Kratz, Sven, et al. "PalmSpace: continuous around-device gestures vs. multitouch for 3D rotation tasks on mobile devices." Proceedings of the international working conference on advanced visual interfaces. 2012. (Year: 2012).*

Xu, Xuhai, et al. "Hand range interface: Information always at hand with a body-centric mid-air input surface." Proceedings of the 20th International Conference on Human-Computer Interaction with Mobile Devices and Services. 2018. (Year: 2018).*

"International Application Serial No. PCT US2023 072721, International Search Report mailed Nov. 3, 2023", 5 pgs.

"International Application Serial No. PCT US2023 072721, Written Opinion mailed Nov. 3, 2023", 8 pgs.

"U.S. Appl. No. 18/320,059, Examiner Interview Summary mailed Apr. 11, 2025", 2 pgs.

"U.S. Appl. No. 18/320,059, Notice of Allowance mailed May 7, 2025", 5 pgs.

"U.S. Appl. No. 18/320,059, Response filed Apr. 23, 2025 to Non Final Office Action mailed Jan. 23, 2025", 11 pgs.

"International Application Serial No. PCT/US2023/072721, International Preliminary Report on Patentability mailed Mar. 13, 2025", 10 pgs.

"U.S. Appl. No. 18/320,059, Non Final Office Action mailed Jan. 23, 2025", 13 pgs.

* cited by examiner

WRIST ROTATION MANIPULATION OF VIRTUAL OBJECTS

TECHNICAL FIELD

The present disclosure relates generally to user interfaces and more particularly to user interfaces used in augmented and virtual reality.

BACKGROUND

A head-worn apparatus may be implemented with a transparent or semi-transparent display through which a user of the head-worn apparatus can view the surrounding environment. Such devices enable a user to see through the transparent or semi-transparent display to view the surrounding environment, and to also see objects (e.g., virtual objects such as a rendering of a 2D or 3D graphic model, images, video, text, and so forth) that are generated for display to appear as a part of, and/or overlaid upon, the surrounding environment. This is typically referred to as "augmented reality" or "AR." A head-worn apparatus may additionally completely occlude a user's visual field and display a virtual environment through which a user may move or be moved. This is typically referred to as "virtual reality" or "VR." As used herein, the term AR refers to either or both augmented reality and virtual reality as traditionally understood, unless the context indicates otherwise.

A user of the head-worn apparatus may access and use a computer software application to perform various tasks or engage in an entertaining activity. To use the computer software application, the user interacts with a user interface provided by the head-worn apparatus.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

DETAILED DESCRIPTION

Figure 1:
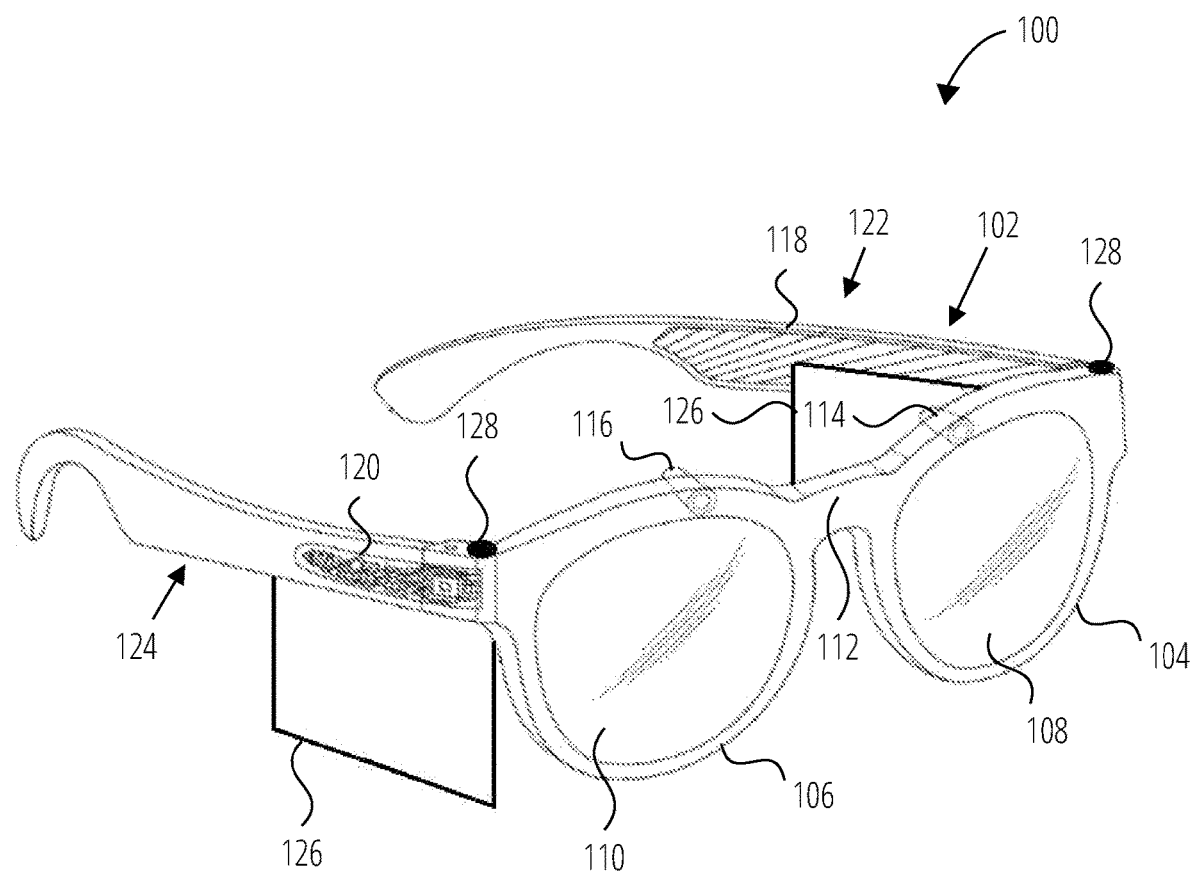
FIG. 1 is a perspective view of a head-worn apparatus, in accordance with some examples.

AR systems are limited when it comes to available user input modalities. As compared other mobile devices, such as mobile phones, it is more complicated for a user of an AR system to indicate user intent and invoke an action or application. When using a mobile phone, a user may go to a home screen and tap on a specific icon to start an application. However, because of a lack of a physical input device such as a touchscreen or keyboard, such interactions are not as easily performed on an AR system. Typically, users can indicate their intent by pressing a limited number of hardware buttons or using a small touchpad. Therefore, it would be desirable to have an input modality that allowed for a greater range of inputs that could be utilized by a user to indicate their intent through a user input.

An input modality that may be utilized with AR systems is hand-tracking combined with Direct Manipulation of Virtual Objects (DMVO) where a user is provided with a user interface that is displayed to the user in an AR overlay having a 2D or 3D rendering. The rendering is of a graphic model in 2D or 3D where virtual objects located in the model correspond to interactive elements of the user interface. In this way, the user perceives the virtual objects as objects within an overlay in the user's field of view of the real-world scene while wearing the AR system, or perceives the virtual objects as objects within a virtual world as viewed by the user while wearing the AR system. To allow the user to manipulate the virtual objects, the AR system detects the user's hands and tracks their movement, location, and/or position to determine the user's interactions with the virtual objects.

Gestures that do not involve DMVO provide another input modality suitable for use with AR systems. Gestures are made by a user moving and positioning portions of the user's body while those portions of the user's body are detectable by an AR system while the user is wearing the AR system. The detectable portions of the user's body may include portions of the user's upper body, arms, hands, and fingers. Components of a gesture may include the movement of the user's arms and hands, location of the user's arms and hands in the real-world scene environment, and positions in which the user holds their upper body, arms, hands, and fingers. Gestures are useful in providing an AR experience for a user as they offer a way of providing user inputs into the AR system during an AR experience without having the user take their focus off of the AR experience. As an example, in an AR experience that is an operational manual for a piece of machinery, the user may simultaneously view the piece of machinery in the real-world scene through the lenses of the AR system, view an AR overlay on the real-world scene view of the machinery, and provide user inputs into the AR system.

By combining hand-tracking DMVO gesture methodologies an improved user input modality is provided to a user of an AR system. The AR system uses a combination of gesture and DMVO methodologies to provide for the user's selection and modification of virtual object of an AR experience. The user indicates that they want to interact with a virtual object of the AR experience by moving their hand to overlap the virtual object. While keeping their hand in an overlapping position, the user rotates their wrist, and the virtual object is rotated as well. To end the interaction, the user moves their hand such that their hand is no longer overlapping the virtual object.

Other technical features may be readily apparent to one skilled in the art from the following figures, descriptions, and claims.

FIG. 1 is a perspective view of an AR system in a form of a head-worn apparatus (e.g., glasses 100 of FIG. 1), in accordance with some examples. The glasses 100 can include a frame 102 made from any suitable material such as plastic or metal, including any suitable shape memory alloy. In one or more examples, the frame 102 includes a first or left optical element holder 104 (e.g., a display or lens holder) and a second or right optical element holder 106 connected by a bridge 112. A first or left optical element 108 and a second or right optical element 110 can be provided within respective left optical element holder 104 and right optical element holder 106. The right optical element 110 and the left optical element 108 can be a lens, a display, a display assembly, or a combination of the foregoing. Any suitable display assembly can be provided in the glasses 100.

The frame 102 additionally includes a left arm or temple piece 122 and a right arm or temple piece 124. In some examples the frame 102 can be formed from a single piece of material so as to have a unitary or integral construction.

The glasses 100 can include a computing device, such as a computer 120, which can be of any suitable type so as to be carried by the frame 102 and, in one or more examples, of a suitable size and shape, so as to be partially disposed in one of the temple piece 122 or the temple piece 124. The computer 120 can include one or more processors with memory, wireless communication circuitry, and a power source. As discussed below, the computer 120 comprises low-power circuitry, high-speed circuitry, and a display processor. Various other examples may include these elements in different configurations or integrated together in different ways. Additional details of aspects of computer 120 may be implemented as illustrated by the data processor 602 discussed below.

The computer 120 additionally includes a battery 118 or other suitable portable power supply. In some examples, the battery 118 is disposed in left temple piece 122 and is electrically coupled to the computer 120 disposed in the right temple piece 124. The glasses 100 can include a connector or port (not shown) suitable for charging the battery 118, a wireless receiver, transmitter or transceiver (not shown), or a combination of such devices.

The glasses 100 include a first or left camera 114 and a second or right camera 116. Although two cameras are depicted, other examples contemplate the use of a single or additional (i.e., more than two) cameras. In one or more examples, the glasses 100 include any number of input sensors or other input/output devices in addition to the left camera 114 and the right camera 116. Such sensors or input/output devices can additionally include biometric sensors, location sensors, motion sensors, and so forth.

In some examples, the left camera 114 and the right camera 116 provide video frame data for use by the glasses 100 to extract 3D information from a real-world scene.

The glasses 100 may also include a touchpad 126 mounted to or integrated with one or both of the left temple piece 122 and right temple piece 124. The touchpad 126 is generally vertically arranged, approximately parallel to a user's temple in some examples. As used herein, generally vertically aligned means that the touchpad is more vertical than horizontal, although potentially more vertical than that. Additional user input may be provided by one or more buttons 128, which in the illustrated examples are provided on the outer upper edges of the left optical element holder 104 and right optical element holder 106. The one or more touchpads 126 and buttons 128 provide a means whereby the glasses 100 can receive input from a user of the glasses 100.

Figure 2:
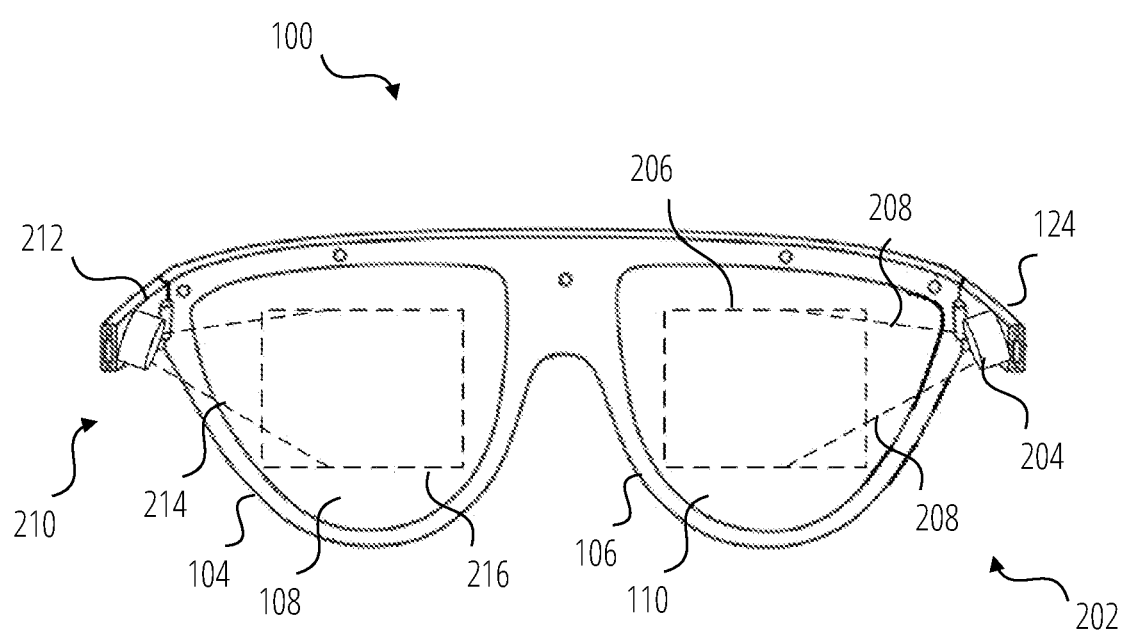
FIG. 2 is a further view of the head-worn apparatus of FIG. 1, in accordance with some examples.

FIG. 2 illustrates the glasses 100 from the perspective of a user. For clarity, a number of the elements shown in FIG. 1 have been omitted. As described in FIG. 1, the glasses 100 shown in FIG. 2 include left optical element 108 and right optical element 110 secured within the left optical element holder 104 and the right optical element holder 106 respectively.

The glasses 100 include forward optical assembly 202 comprising a right projector 204 and a right near eye display 206, and a forward optical assembly 210 including a left projector 212 and a left near eye display 216.

In some examples, the near eye displays are waveguides. The waveguides include reflective or diffractive structures (e.g., gratings and/or optical elements such as mirrors, lenses, or prisms). Light 208 emitted by the projector 204 encounters the diffractive structures of the waveguide of the near eye display 206, which directs the light towards the right eye of a user to provide an image on or in the right optical element 110 that overlays the view of the real-world scene seen by the user. Similarly, light 214 emitted by the projector 212 encounters the diffractive structures of the waveguide of the near eye display 216, which directs the light towards the left eye of a user to provide an image on or in the left optical element 108 that overlays the view of the real-world scene seen by the user. The combination of a GPU, the forward optical assembly 202, the left optical element 108, and the right optical element 110 provide an optical engine of the glasses 100. The glasses 100 use the optical engine to generate an overlay of the real-world scene view of the user including display of a user interface to the user of the glasses 100.

It will be appreciated however that other display technologies or configurations may be utilized within an optical engine to display an image to a user in the user's field of view. For example, instead of a projector 204 and a waveguide, an LCD, LED or other display panel or surface may be provided.

In use, a user of the glasses 100 will be presented with information, content and various user interfaces on the near eye displays. As described in more detail herein, the user can then interact with the glasses 100 using a touchpad 126 and/or the buttons 128, voice inputs or touch inputs on an associated device (e.g., client device 626 illustrated in FIG. 6), and/or hand movements, locations, and positions detected by the glasses 100.

In some examples, the glasses 100 comprise a stand-alone AR system that provides an AR experience to a user of the glasses 100. In some examples, the glasses 100 are a component of an AR system that includes one or more other devices providing additional computational resources and or additional user input and output resources. The other devices may comprise a smart phone, a general purpose computer, or the like.

Figure 3:
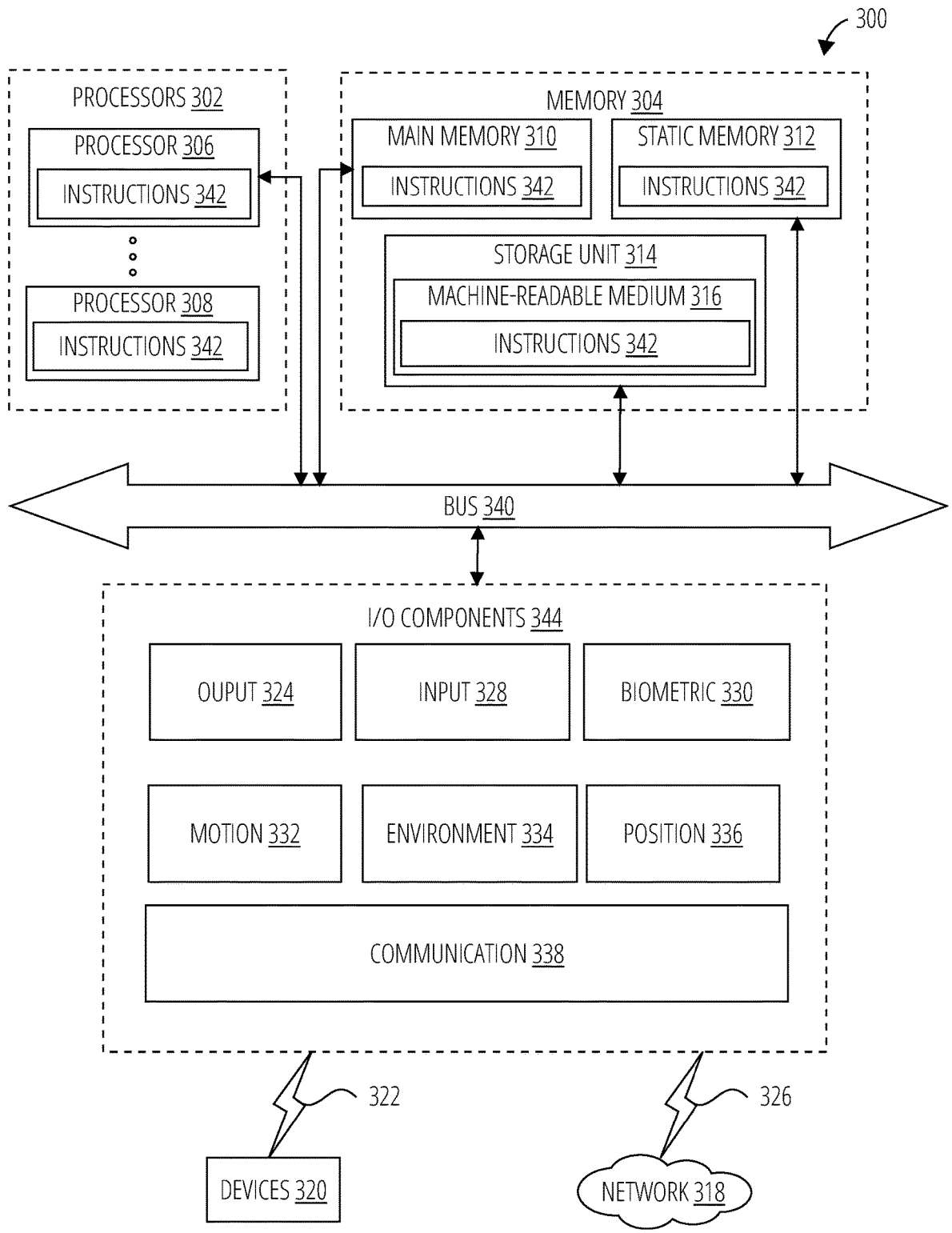
FIG. 3 is a diagrammatic representation of a machine, in the form of a computing apparatus within which a set of instructions may be executed for causing the machine to perform any one or more of the methodologies discussed herein in accordance with some examples.

FIG. 3 is a diagrammatic representation of a computing apparatus 300 within which instructions 342 (e.g., software, a program, an application, an applet, an app, or other executable code) for causing the computing apparatus 300 to perform any one or more of the methodologies discussed herein may be executed. The computing apparatus 300 may be utilized as a computer 120 of glasses 100 of FIG. 1. For example, the instructions 342 may cause the computing apparatus 300 to execute any one or more of the methods described herein. The instructions 342 transform the general, non-programmed computing apparatus 300 into a particular computing apparatus 300 programmed to carry out the described and illustrated functions in the manner described. The computing apparatus 300 may operate as a standalone device or may be coupled (e.g., networked) to other machines. In a networked deployment, the computing apparatus 300 may operate in the capacity of a server machine or a client machine in a server-client network environment, or as a peer machine in a peer-to-peer (or distributed) network environment. The computing apparatus 300 may comprise, but not be limited to, a server computer, a client computer, a personal computer (PC), a tablet computer, a laptop computer, a netbook, a set-top box (STB), a PDA, an entertainment media system, a cellular telephone, a smart phone, a mobile device, a head-worn apparatus (e.g., a smart watch), a smart home device (e.g., a smart appliance), other smart devices, a web appliance, a network router, a network switch, a network bridge, or any machine capable of executing the instructions 342, sequentially or otherwise, that specify actions to be taken by the computing apparatus 300. Further, while a single computing apparatus 300 is illustrated, the term "machine" may also be taken to include a collection of machines that individually or jointly execute the instructions 342 to perform any one or more of the methodologies discussed herein.

The computing apparatus 300 may include processors 302, memory 304, and instructions 342, which may be configured to communicate with one another via a bus 340. In some examples, the processors 302 (e.g., a Central Processing Unit (CPU), a Reduced Instruction Set Computing (RISC) processor, a Complex Instruction Set Computing (CISC) processor, a Graphics Processing Unit (GPU), a Digital Signal Processor (DSP), an ASIC, a Radio-Frequency Integrated Circuit (RFIC), another processor, or any suitable combination thereof) may include, for example, a processor 306 and a processor 308 that execute the instructions 342. The term "processor" is intended to include multi-core processors that may comprise two or more independent processors (sometimes referred to as "cores") that may execute instructions contemporaneously. Although FIG. 3 shows multiple processors 302, the computing apparatus 300 may include a single processor with a single core, a single processor with multiple cores (e.g., a multi-core processor), multiple processors with a single core, multiple processors with multiples cores, or any combination thereof.

The memory 304 includes a main memory 310, a static memory 312, and a storage unit 314, both accessible to the processors 302 via the bus 340. The main memory 304, the static memory 312, and storage unit 314 store the instructions 342 embodying any one or more of the methodologies or functions described herein. The instructions 342 may also reside, completely or partially, within the main memory 310, within the static memory 312, within machine-readable medium 316 within the storage unit 314, within one or more of the processors 302 (e.g., within the processor's cache memory), or any suitable combination thereof, during execution thereof by the computing apparatus 300.

The I/O components 344 may include a wide variety of components to receive input, provide output, produce output, transmit information, exchange information, capture measurements, and so on. The specific I/O components 344 that are included in a particular machine will depend on the type of machine. For example, portable machines such as mobile phones may include a touch input device or other such input mechanisms, while a headless server machine will likely not include such a touch input device. It will be appreciated that the I/O components 344 may include many other components that are not shown in FIG. 3. In various examples, the I/O components 344 may include output components 324 and input components 328. The output components 324 may include visual components (e.g., a display such as a plasma display panel (PDP), a light-emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 328 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

In some examples, the I/O components 344 may include biometric components 330, motion components 332, environmental components 334, and position components 336, among a wide array of other components. For example, the biometric components 330 include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 332 may include inertial measurement units, acceleration sensor components (e.g., accelerometer), gravitation sensor components, rotation sensor components (e.g., gyroscope), and so forth. The environmental components 334 include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals associated to a surrounding physical environment. The position components 336 may include location sensor components (e.g., a GPS receiver component), altitude sensor components (e.g., altimeters or barometers that detect air pressure from which altitude may be derived), orientation sensor components (e.g., an Inertial Measurement Unit (IMU)), and the like.

Communication may be implemented using a wide variety of technologies. The I/O components 344 further include communication components 338 operable to couple the computing apparatus 300 to a network 318 or devices 320 via a coupling 326 and a coupling 322, respectively. For example, the communication components 338 may include a network interface component or another suitable device to interface with the network 318. In further examples, the communication components 338 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 320 may be another machine or any of a wide variety of peripheral devices (e.g., a peripheral device coupled via a USB).

Moreover, the communication components 338 may detect identifiers or include components operable to detect identifiers. For example, the communication components 338 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 338, such as location via Internet Protocol (IP) geolocation, location via Wi-Fi® signal triangulation, location via detecting an NFC beacon signal that may indicate a particular location, and so forth.

The various memories (e.g., memory 304, main memory 310, static memory 312, and/or memory of the processors 302) and/or storage unit 314 may store one or more sets of instructions and data structures (e.g., software) embodying or used by any one or more of the methodologies or functions described herein. These instructions (e.g., the instructions 342), when executed by processors 302, cause various operations to implement the disclosed examples.

The instructions 342 may be transmitted or received over the network 318, using a transmission medium, via a network interface device (e.g., a network interface component included in the communication components 338) and using any one of a number of well-known transfer protocols (e.g., hypertext transfer protocol (HTTP)). Similarly, the instructions 342 may be transmitted or received using a transmission medium via the coupling 322 (e.g., a peer-to-peer coupling) to the devices 320.

Figure 4A:
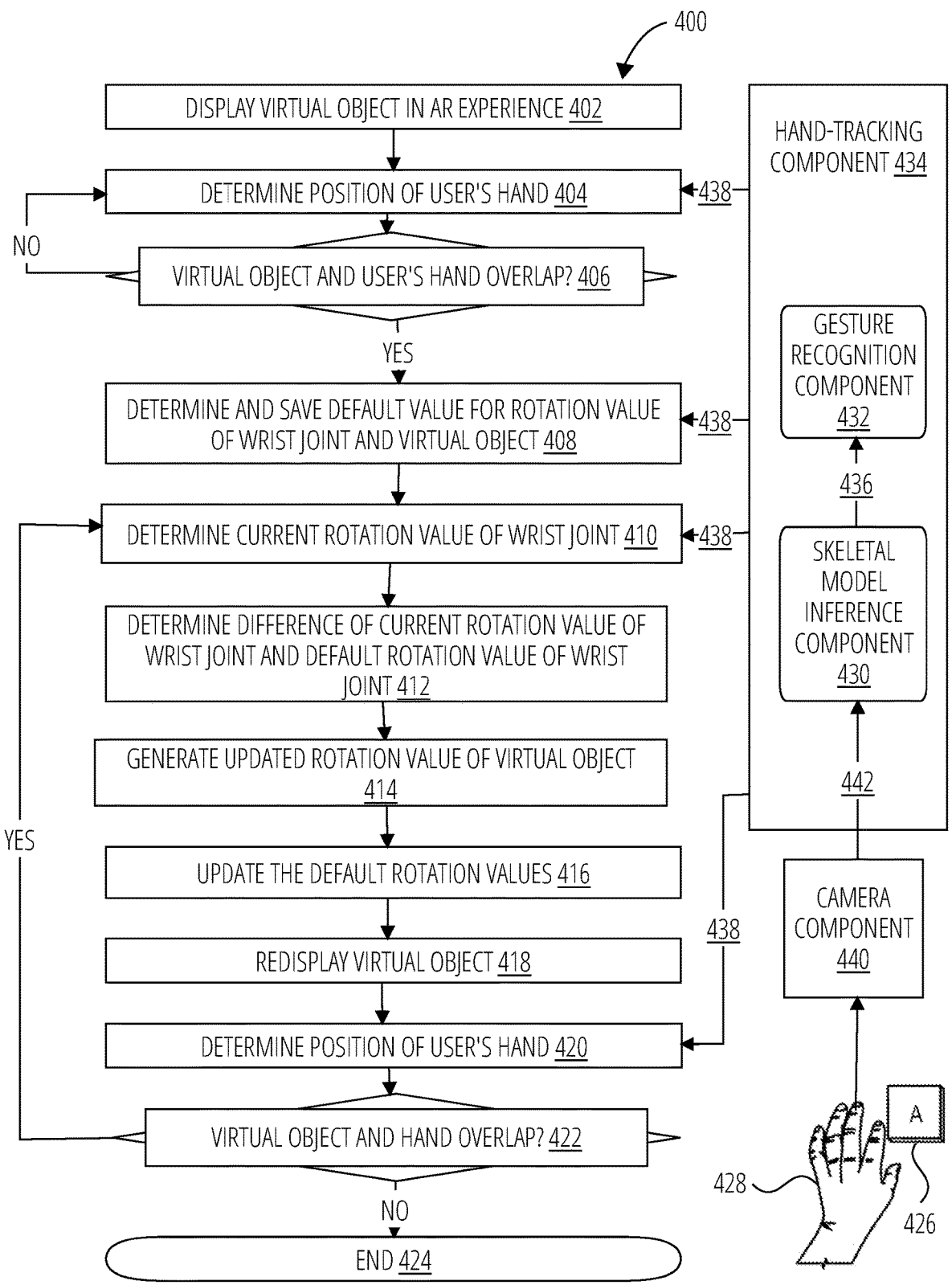
FIG. 4A is a process flow diagram of a virtual object rotation method in accordance with some examples.
Figure 4B:
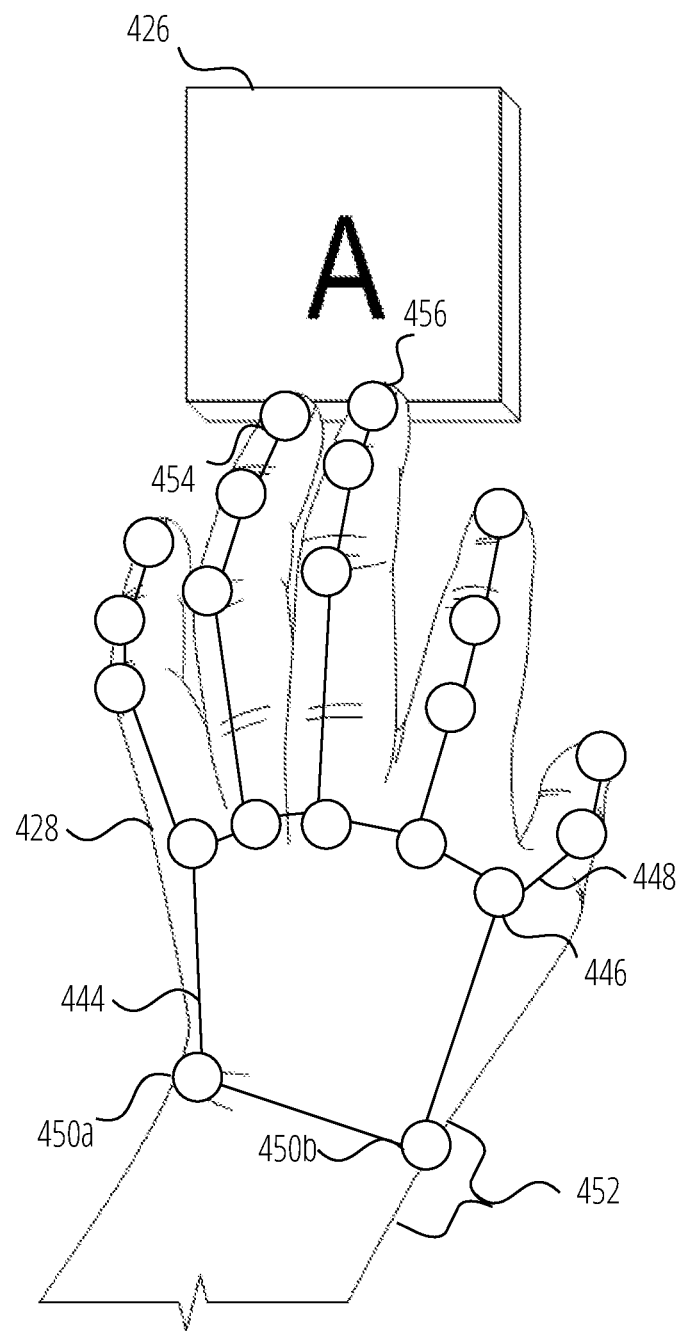
FIG. 4B, FIG. 4C, and FIG. 4D illustrate a user interaction with a virtual object of an AR experience in accordance with some examples.
Figure 4C:
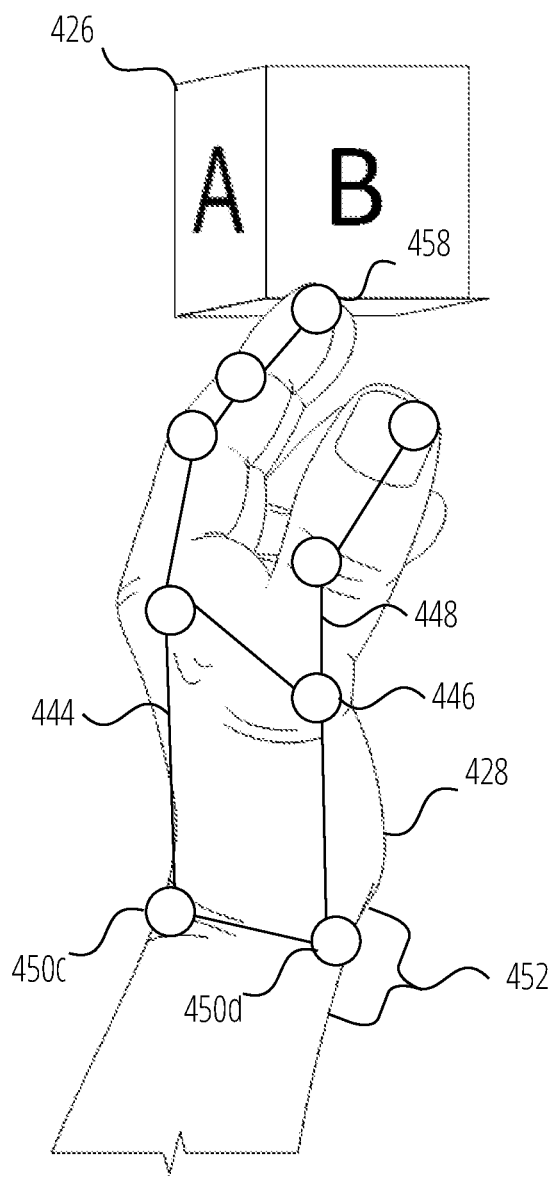
Figure 4D:
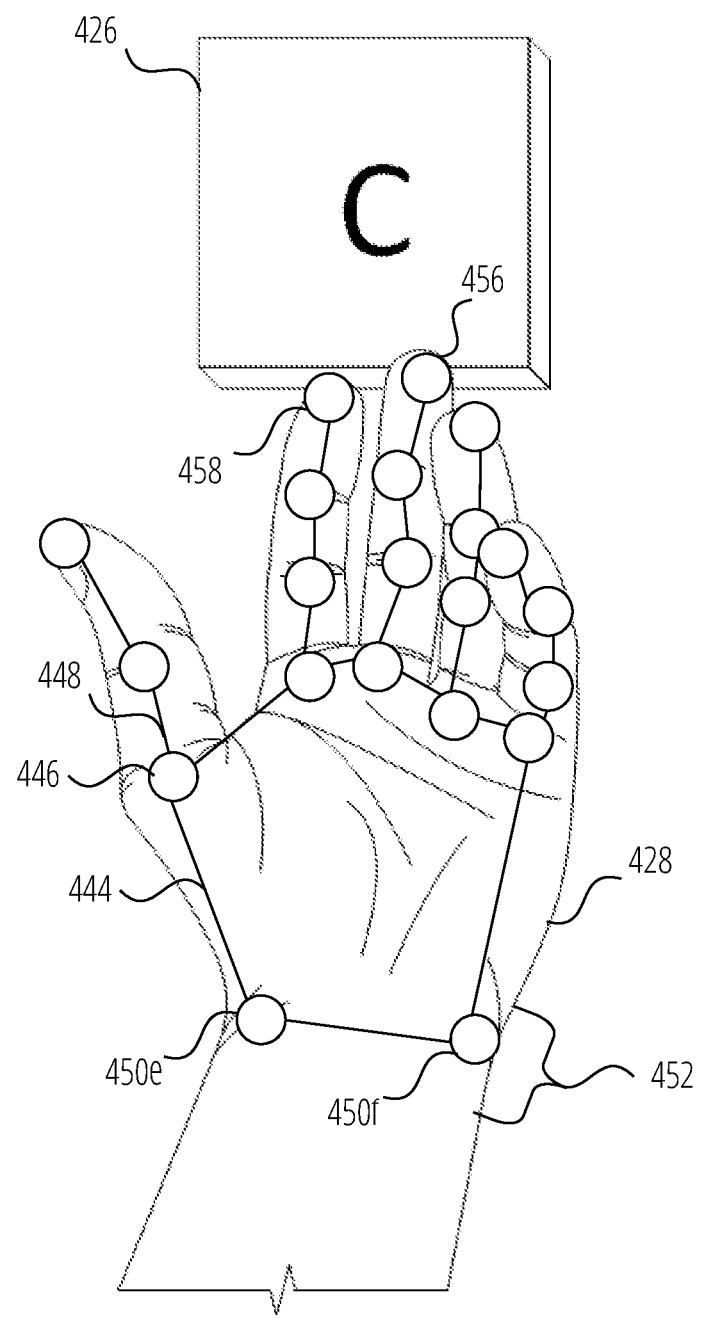

FIG. 4A is a process flow diagram of a virtual object rotation method in accordance with some examples. FIG. 4B, FIG. 4C, and FIG. 4D illustrate a user interaction with a virtual object of an AR experience in accordance with some examples. A virtual object rotation method 400 is used by an AR system, such as glasses 100 (of FIG. 1), to provide a continuous real-time input modality to a user of the AR system where the user rotates a virtual object, such as virtual object 426, using a hand gesture. The virtual object can be a component of an AR experience provided to the user by the AR system using an AR application. The AR application can be a useful application such as a maintenance guide, an interactive map, an interactive tour guide, a tutorial, or the like. The AR application may also be an entertainment application such as a video game, an interactive video, or the like.

In operation 402, the AR system displays a virtual object, such as virtual object 426, in an AR experience being provided to the user by the AR system. For example, AR system uses one or more cameras, such as a left camera 114 and a right camera 116 (of FIG. 1) of a camera component 440 to capture video frame data of a real-world scene being viewed by a user of the AR system. Simultaneously, the AR system captures tracking data for the AR system using a tracking module 640 (of FIG. 6) while capturing the real-world scene video frame data. The tracking data includes orientation and location data of the AR system within the real-world scene. The AR system generates a 3D model in a 3D coordinate system of the real-world scene based on the real-world scene video frame data and the tracking data. The AR system creates the virtual object 426 in the 3D model such that the virtual object 426 includes 3D geometric data expressed in the 3D coordinate system describing the virtual object 426 as well as graphics data defining how the virtual object 426 will be displayed to the user. The AR system uses an optical engine as described in FIG. 1 to provide an AR experience to a user of the AR system where the AR experience includes a display of a 3D rendering of the virtual object 426 appearing to the user as if the virtual object was a component of the real-world scene.

In operation 404, the AR system receives hand-tracking data 438 from a hand-tracking component 434 of the AR system and detects a position of a hand of the user 428 based on the hand-tracking data 438. For example, the hand-tracking component 434 uses a camera component 440 having one or more cameras, such as left camera 114 and right camera 116 (both of FIG. 1), to capture hand-tracking video frame data 442 of the hand of the user 428 as the user views and interacts with a virtual object 426. The virtual object 426 is provided to the user by the AR system as part of an AR experience. A skeletal model inference component 430 of the hand-tracking component 434 receives the hand-tracking video frame data 442 from the camera component 440 and generates a skeletal model 444 (of FIG. 4B, FIG. 4C, and FIG. 4D) of the hand of the user 428 based on the hand-tracking video frame data 442. The hand-tracking component 434 provides data of the skeletal model 444 to the AR system as part of hand-tracking data 438.

In some examples, the skeletal model inference component 430 extracts feature data from the hand-tracking video frame data 442 using one or more computer vision methodologies including, but not limited to, Harris corner detection, Shi-Tomasi corner detection, Scale-Invariant Feature Transform (SIFT), Speeded-Up Robust Features (SURF), Features from Accelerated Segment Test (FAST), Oriented FAST and Rotated BRIEF (ORB), and the like. The skeletal model inference component 430 generates skeletal model data 436 of the skeletal model 444 of the hand of the user 428 based on the extracted feature data. In some examples, the skeletal model inference component 430 generates the skeletal model 444 using geometric methodologies and one or more previously generated geometric models to generate the skeletal model 444. In some examples, the skeletal model inference component 430 generates the skeletal model data 436 data on the basis of categorizing the extracted feature data using artificial intelligence methodologies and a skeletal model generation model previously generated using machine learning methodologies. In some examples, the skeletal model generation model comprises, but is not limited to, a neural network, a learning vector quantization network, a logistic regression model, a support vector machine, a random decision forest, a naïve Bayes model, a linear discriminant analysis model, a K-nearest neighbor model, and the like. In some examples, machine learning methodologies may include, but are not limited to, supervised learning, unsupervised learning, semi-supervised learning, reinforcement learning, dimensionality reduction, self-learning, feature learning, sparse dictionary learning, anomaly detection, or the like.

The skeletal model 444 comprises one or more nodes, such as node 446 (of FIG. 4B, FIG. 4C, and FIG. 4D), linked together by one or more links, such as link 448 (of FIG. 4B, FIG. 4C, and FIG. 4D). The one or more nodes include 3D coordinate data for specified features of the hand of the user 428 in the 3D model of the real-world scene. The AR system uses the 3D coordinate data of the one or more nodes of the skeletal model 444 to determine a position of the hand of the user 428 within the 3D model and within the real-world scene.

In operation 406, the AR system determines whether the virtual object 426 and the hand of the user 428 overlap in the 3D model of the real-world scene. For example, the AR system uses the 3D coordinate data of the one or more nodes of the skeletal model 444 and the 3D coordinate data of the virtual object 426 to determine if the skeletal model 444 and the virtual object 426 intersect one another in the 3D model. In some examples, an overlap of the hand of the user 428 and the virtual object 426 is determined based on a viewpoint of the user where coordinates on a horizontal axis of 3D coordinate system and coordinates on a vertical axis of the 3D coordinate system are used to determine that the hand of the user 428 and the virtual object 426 overlap. For instance, coordinates on a depth axis of the 3D coordinate system are ignored when determining an overlap from the user's perspective.

As illustrated in FIG. 4B, the AR system determines that the hand of the user 428 overlaps the virtual object 426 as indicated by a ring finger node 454 and a middle finger node 456 overlapping the virtual object 426. The virtual object 426 has a 1st surface having markings of a letter "A".

In some examples, the AR system determines if the hand of the user 428 and the virtual object 426 overlap based on the hand-tracking video frame data 442 using one or more computer vision methodologies including, but not limited to, Harris corner detection, Shi-Tomasi corner detection, Scale-Invariant Feature Transform (SIFT), Speeded-Up Robust Features (SURF), Features from Accelerated Segment Test (FAST), Oriented FAST and Rotated BRIEF (ORB), and the like. The AR system extracts feature data of the hand of the user 428 and determines 3D coordinate data of the hand of the user 428 based on the feature data. The AR system determines an intersection of the one or more features hand of the user 428 based on the 3D coordinate data of the hand of the user 428 and the 3D coordinate data of the virtual object.

In operation 406, if the AR system determines that the virtual object 426 and the hand of the user 428 do not overlap, the AR system transitions back to operation 404 and continues to determine the position of the hand of the user 428 until an overlap is detected between the hand of the user 428 and the virtual object 426.

In operation 406, if the AR system determines that the hand of the user 428 and the virtual object 426 overlap, the AR system transitions to operation 408.

In operation 408, the AR system determines a default rotation value of a wrist joint 452 (of FIG. 4B, FIG. 4C, and FIG. 4D) of the hand of the user 428 based on skeletal model data 436 received from the hand-tracking component 434. For example, the skeletal model 444 includes one or more wrist nodes, such as wrist nodes 450a and 450b (of FIG. 4B), wrist nodes 450c and 450d (of FIG. 4C), and wrist nodes 450e and 450f (of FIG. 4D). The AR system determines a rotation of the wrist joint 452 of the hand of the user 428 based on the skeletal model 444 including the one or more wrist nodes.

In some examples, the AR system uses geometric methodologies to compare the skeletal model 444 to previously generated wrist joint models and generates a rotation value of the wrist joint 452 based on the comparison.

In some examples, the AR system uses a gesture recognition component 432 to determine a rotation value of the wrist joint 452 based on the skeletal model data 436 generated by the skeletal model inference component 430. In some examples, the gesture recognition component 432 generates the rotation value of the wrist joint 452 on the basis of categorizing the skeletal model data 436 using artificial intelligence methodologies and a wrist rotation model previously generated using machine learning methodologies. In some examples, a wrist rotation model comprises, but is not limited to, a neural network, a learning vector quantization network, a logistic regression model, a support vector machine, a random decision forest, a naïve Bayes model, a linear discriminant analysis model, a K-nearest neighbor model, and the like. In some examples, machine learning methodologies may include, but are not limited to, supervised learning, unsupervised learning, semi-supervised learning, reinforcement learning, dimensionality reduction, self-learning, feature learning, sparse dictionary learning, anomaly detection, and the like. The hand-tracking component 434 includes the rotation value of the wrist joint 452 in the hand-tracking data 438 communicated to the AR system.

In some examples, the gesture recognition component 432 generates the rotation value of the wrist joint 452 based on the hand-tracking video frame data 442. For example, the gesture recognition component 432 extracts feature data from the hand-tracking video frame data 442 using one or more computer vision methodologies including, but not limited to, Harris corner detection, Shi-Tomasi corner detection, Scale-Invariant Feature Transform (SIFT), Speeded-Up Robust Features (SURF), Features from Accelerated Segment Test (FAST), Oriented FAST and Rotated BRIEF (ORB), and the like. The gesture recognition component 432 generates a rotation value of the wrist joint 452 of the hand of the user 428 based on the extracted feature data. In some examples, the gesture recognition component 432 generates a rotation value of the wrist joint 452 using geometric methodologies and one or more previously generated geometric models to generate the rotation value of the wrist joint 452. In some examples, the skeletal model inference component 430 generates the rotation value of the wrist joint 452 on the basis of categorizing the extracted feature data using artificial intelligence methodologies and using a model previously generated using machine learning methodologies. In some examples, a model comprises, but is not limited to, a neural network, a learning vector quantization network, a logistic regression model, a support vector machine, a random decision forest, a naïve Bayes model, a linear discriminant analysis model, a K-nearest neighbor model, and the like. In some examples, machine learning methodologies may include, but are not limited to, supervised learning, unsupervised learning, semi-supervised learning, reinforcement learning, dimensionality reduction, self-learning, feature learning, sparse dictionary learning, anomaly detection, or the like.

In operation 408, the AR system saves the default rotation value of the wrist joint 452 and a default rotation value of the virtual object 426. In some examples, a rotation value of the virtual object 426 is computed from the 3D coordinate data of the virtual object 426.

In operation 410, the AR system determines a current rotation value of the wrist joint 452 based on current hand-tracking data 438 received from the hand-tracking component 434. In some examples, the AR system performs the determination of the rotation value of the wrist joint 452 every 500 milliseconds.

In operation 412, the AR system determines a difference between a rotation value of the wrist joint 452 and the default rotation value for wrist joint 452.

In operation 414, the AR system generates an updated rotation value of the virtual object 426 based on the current rotation value of the wrist joint 452, the default rotation value of the virtual object 426, and the difference between the current rotation value of the wrist joint 452 and the default rotation value for wrist joint 452. For example, the AR system adds the difference between the current rotation value of the wrist joint 452 and the default rotation value for wrist joint 452 to the default rotation value of the virtual object 426.

In operation 416, the AR system updates the default rotation value of the wrist joint 452 and the default rotation value of the virtual object 426.

In operation 418, the AR system redisplays the virtual object 426 based on the updated rotation value of the virtual object 426.

As illustrated in FIG. 4C, the AR system determines that the user has rotated their wrist joint 452 approximately 90 degrees. In response, the AR system has rotated the virtual object 426 approximately 90 degrees as well, thus exposing another surface of the virtual object 426 marked "B". The hand of the user 428 remains overlapping the virtual object 426 as indicated by an index finger node 458.

In operation 420, the AR system receives hand-tracking data 438 from the hand-tracking component 434 and determines the position of the hand of the user 428 as described herein in reference to operation 404.

In operation 422, the AR system determines if the hand of the user 428 and the virtual object 426 are still overlapped, thus continuing the user's interaction with, and rotation of, the virtual object 426. Based on a determination that the hand of the user 428 and the virtual object 426 are still overlapping, the AR system transitions to operation 410 for continued processing of the user's input and rotation of the virtual object 426 in response to rotation of the wrist joint 452 of the hand of the user 428.

As illustrated in FIG. 4D, the AR system determines that the user has rotated their wrist joint 452 approximately 180 degrees. In response, the AR system rotates the virtual object 426 approximately 180 degrees to expose and display a 3rd surface having a marking of the letter "C". The hand of the user 428 remains overlapping the virtual object 426 as indicated by the index finger node 458 and the middle finger node 456.

In operation 422, based on a determination that the hand of the user 428 is no longer overlapping with the virtual object 426, the AR system ends interaction by the user with the virtual process of rotating the virtual object 426 by transitioning to operation 424.

In some examples, the AR system performs the functions of the gesture recognition component 432 and the skeletal model inference component 430 by utilizing various APIs and system libraries.

Figure 5:
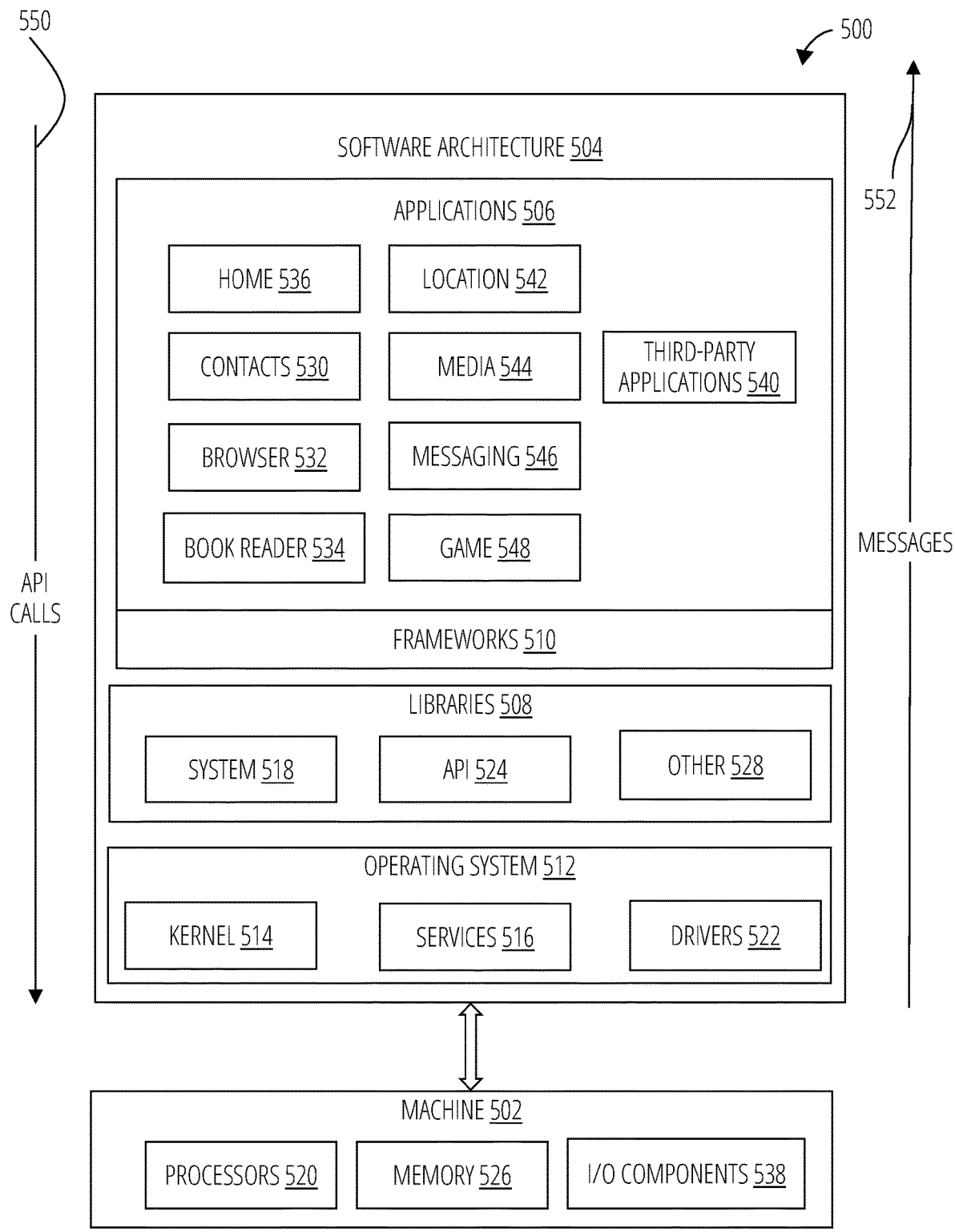
FIG. 5 is a block diagram showing a software architecture within which the present disclosure may be implemented, in accordance with some examples.

FIG. 5 is a block diagram 500 illustrating a software architecture 504, which can be installed on any one or more of the devices described herein. The software architecture 504 is supported by hardware such as a machine 502 that includes processors 520, memory 526, and I/O components 538. In this example, the software architecture 504 can be conceptualized as a stack of layers, where individual layers provide a particular functionality. The software architecture 504 includes layers such as an operating system 512, libraries 508, frameworks 510, and applications 506. Operationally, the applications 506 invoke API calls 550 through the software stack and receive messages 552 in response to the API calls 550.

The operating system 512 manages hardware resources and provides common services. The operating system 512 includes, for example, a kernel 514, services 516, and drivers 522. The kernel 514 acts as an abstraction layer between the hardware and the other software layers. For example, the kernel 514 provides memory management, processor management (e.g., scheduling), component management, networking, and security settings, among other functionalities. The services 516 can provide other common services for the other software layers. The drivers 522 are responsible for controlling or interfacing with the underlying hardware. For instance, the drivers 522 can include display drivers, camera drivers, BLUETOOTH® or BLUETOOTH® Low Energy drivers, flash memory drivers, serial communication drivers (e.g., Universal Serial Bus (USB) drivers), WI-FI® drivers, audio drivers, power management drivers, and so forth.

The libraries 508 provide a low-level common infrastructure used by the applications 506. The libraries 508 can include system libraries 518 (e.g., C standard library) that provide functions such as memory allocation functions, string manipulation functions, mathematic functions, and the like. In addition, the libraries 508 can include API libraries 524 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two dimensions (2D) and three dimensions (3D) graphic content on a display, GLMotif used to implement user interfaces), image feature extraction libraries (e.g., OpenIMAJ), database libraries (e.g., SQLite to provide various relational database functions), web libraries (e.g., WebKit to provide web browsing functionality), and the like. The libraries 508 can also include a wide variety of other libraries 528 to provide many other APIs to the applications 506.

The frameworks 510 provide a high-level common infrastructure that is used by the applications 506. For example, the frameworks 510 provide various graphical user interface (GUI) functions, high-level resource management, and high-level location services. The frameworks 510 can provide a broad spectrum of other APIs that can be used by the applications 506, some of which may be specific to a particular operating system or platform.

In some examples, the applications 506 may include a home application 536, a contacts application 530, a browser application 532, a book reader application 534, a location application 542, a media application 544, a messaging application 546, a game application 548, and a broad assortment of other applications such as third-party applications 540. The applications 506 are programs that execute functions defined in the programs. Various programming languages can be employed to create one or more of the applications 506, structured in a variety of manners, such as object-oriented programming languages (e.g., Objective-C, Java, or C++) or procedural programming languages (e.g., C or assembly language). In a specific example, the third-party applications 540 (e.g., applications developed using the ANDROID™ or IOS™ software development kit (SDK) by an entity other than the vendor of the particular platform) may be mobile software running on a mobile operating system such as IOS™, ANDROID™, WINDOWS® Phone, or another mobile operating system. In this example, the third-party applications 540 can invoke the API calls 550 provided by the operating system 512 to facilitate functionality described herein.

Figure 6:
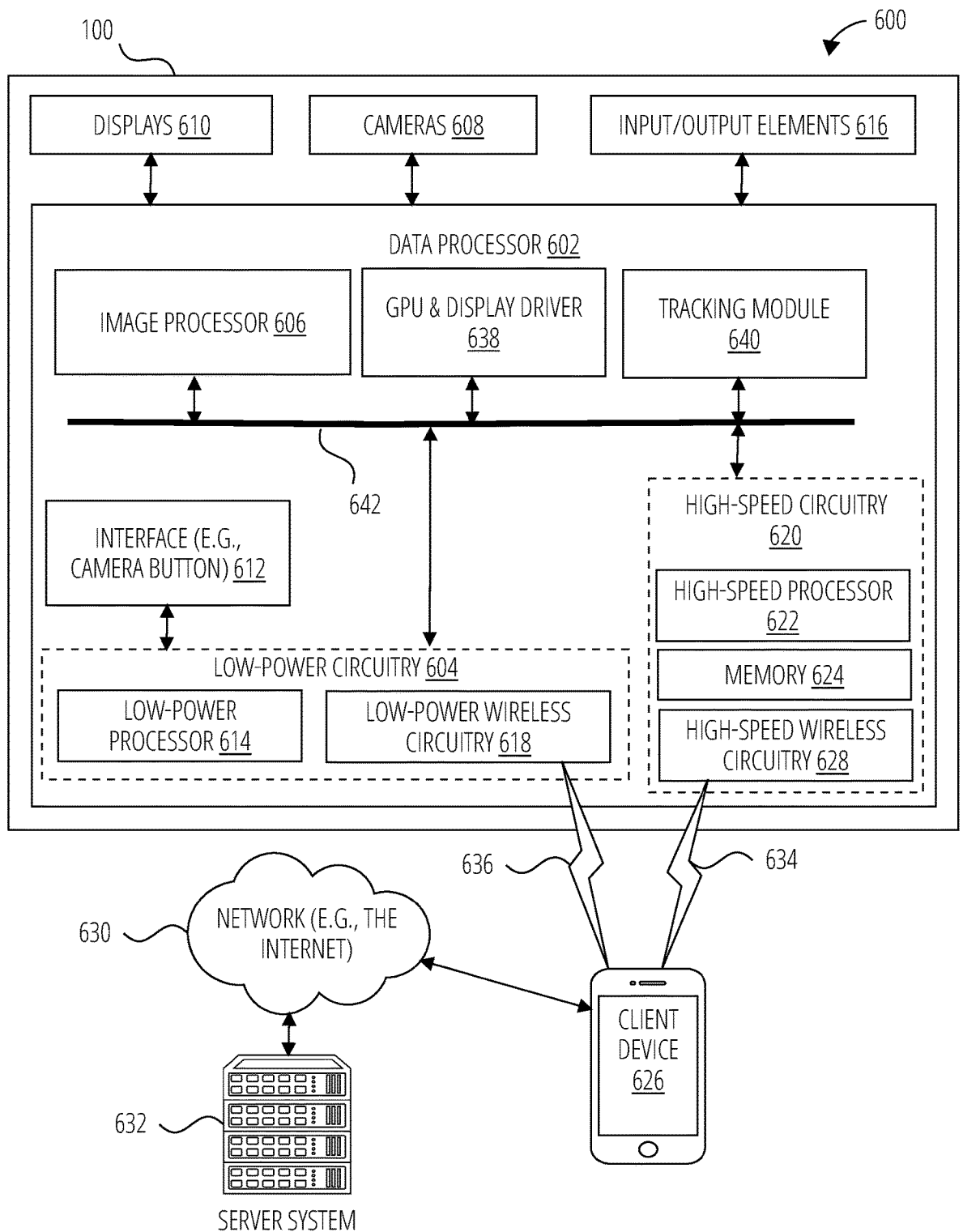
FIG. 6 is a block diagram illustrating details of the head-worn apparatus of FIG. 1, in accordance with some examples.

FIG. 6 is a block diagram illustrating a networked system 600 including details of the glasses 100, in accordance with some examples. The networked system 600 includes the glasses 100, a client device 626, and a server system 632. The client device 626 may be a smartphone, tablet, phablet, laptop computer, access point, or any other such device capable of connecting with the glasses 100 using a low-power wireless connection 636 and/or a high-speed wireless connection 634. The client device 626 is connected to the server system 632 via the network 630. The network 630 may include any combination of wired and wireless connections. The server system 632 may be one or more computing devices as part of a service or network computing system. The client device 626 and any elements of the server system 632 and network 630 may be implemented using details of the software architecture 504 or the computing apparatus 300 described in FIG. 5 and FIG. 3 respectively.

The glasses 100 include a data processor 602, displays 610, one or more cameras 608, and additional input/output elements 616. The input/output elements 616 may include microphones, audio speakers, biometric sensors, additional sensors, or additional display elements integrated with the data processor 602. Examples of the input/output elements 616 are discussed further with respect to FIG. 5 and FIG. 3. For example, the input/output elements 616 may include any of I/O components 344 including output components 324, motion components 332, and so forth. Examples of the displays 610 are discussed in FIG. 2. In the particular examples described herein, the displays 610 include a display for the user's left and right eyes.

The data processor 602 includes an image processor 606 (e.g., a video processor), a GPU & display driver 638, a tracking module 640, an interface 612, low-power circuitry 604, and high-speed circuitry 620. The components of the data processor 602 are interconnected by a bus 642.

The interface 612 refers to any source of a user command that is provided to the data processor 602. In one or more examples, the interface 612 is a physical button that, when depressed, sends a user input signal from the interface 612 to a low-power processor 614. A depression of such button followed by an immediate release may be processed by the low-power processor 614 as a request to capture a single image, or vice versa. A depression of such a button for a first period of time may be processed by the low-power processor 614 as a request to capture video data while the button is depressed, and to cease video capture when the button is released, with the video captured while the button was depressed stored as a single video file. Alternatively, depression of a button for an extended period of time may capture a still image. In some examples, the interface 612 may be any mechanical switch or physical interface capable of accepting user inputs associated with a request for data from the cameras 608. In other examples, the interface 612 may have a software component, or may be associated with a command received wirelessly from another source, such as from the client device 626.

The image processor 606 includes circuitry to receive signals from the cameras 608 and process those signals from the cameras 608 into a format suitable for storage in the memory 624 or for transmission to the client device 626. In one or more examples, the image processor 606 (e.g., video processor) comprises a microprocessor integrated circuit (IC) customized for processing sensor data from the cameras 608, along with volatile memory used by the microprocessor in operation.

The low-power circuitry 604 includes the low-power processor 614 and the low-power wireless circuitry 618. These elements of the low-power circuitry 604 may be implemented as separate elements or may be implemented on a single IC as part of a system on a single chip. The low-power processor 614 includes logic for managing the other elements of the glasses 100. As described above, for example, the low-power processor 614 may accept user input signals from the interface 612. The low-power processor 614 may also be configured to receive input signals or instruction communications from the client device 626 via the low-power wireless connection 636. The low-power wireless circuitry 618 includes circuit elements for implementing a low-power wireless communication system. Bluetooth™ Smart, also known as Bluetooth™ low energy, is one standard implementation of a low power wireless communication system that may be used to implement the low-power wireless circuitry 618. In other examples, other low power communication systems may be used.

The high-speed circuitry 620 includes a high-speed processor 622, a memory 624, and a high-speed wireless circuitry 628. The high-speed processor 622 may be any processor capable of managing high-speed communications and operation of any general computing system used for the data processor 602. The high-speed processor 622 includes processing resources used for managing high-speed data transfers on the high-speed wireless connection 634 using the high-speed wireless circuitry 628. In some examples, the high-speed processor 622 executes an operating system such as a LINUX operating system or other such operating system such as the operating system 512 of FIG. 5. In addition to any other responsibilities, the high-speed processor 622 executing a software architecture for the data processor 602 is used to manage data transfers with the high-speed wireless circuitry 628. In some examples, the high-speed wireless circuitry 628 is configured to implement Institute of Electrical and Electronic Engineers (IEEE) 802.11 communication standards, also referred to herein as Wi-Fi. In other examples, other high-speed communications standards may be implemented by the high-speed wireless circuitry 628.

The memory 624 includes any storage device capable of storing camera data generated by the cameras 608 and the image processor 606. While the memory 624 is shown as integrated with the high-speed circuitry 620, in other examples, the memory 624 may be an independent standalone element of the data processor 602. In some such examples, electrical routing lines may provide a connection through a chip that includes the high-speed processor 622 from image processor 606 or the low-power processor 614 to the memory 624. In other examples, the high-speed processor 622 may manage addressing of the memory 624 such that the low-power processor 614 will boot the high-speed processor 622 any time that a read or write operation involving the memory 624 is desired.

The tracking module 640 estimates a pose of the glasses 100. For example, the tracking module 640 uses image data and associated inertial data from the cameras 608 and the position components 336, as well as GPS data, to track a location and determine a pose of the glasses 100 relative to a frame of reference (e.g., real-world scene environment). The tracking module 640 continually gathers and uses updated sensor data describing movements of the glasses 100 to determine updated three-dimensional poses of the glasses 100 that indicate changes in the relative position and orientation relative to physical objects in the real-world scene environment. The tracking module 640 permits visual placement of virtual objects relative to physical objects by the glasses 100 within the field of view of the user via the displays 610.

The GPU & display driver 638 may use the pose of the glasses 100 to generate frames of virtual content or other content to be presented on the displays 610 when the glasses 100 are functioning in a traditional augmented reality mode. In this mode, the GPU & display driver 638 generates updated frames of virtual content based on updated three-dimensional poses of the glasses 100, which reflect changes in the position and orientation of the user in relation to physical objects in the user's real-world scene environment.

One or more functions or operations described herein may also be performed in an application resident on the glasses 100 or on the client device 626, or on a remote server. For example, one or more functions or operations described herein may be performed by one of the applications 506 such as messaging application 546.

Figure 7:
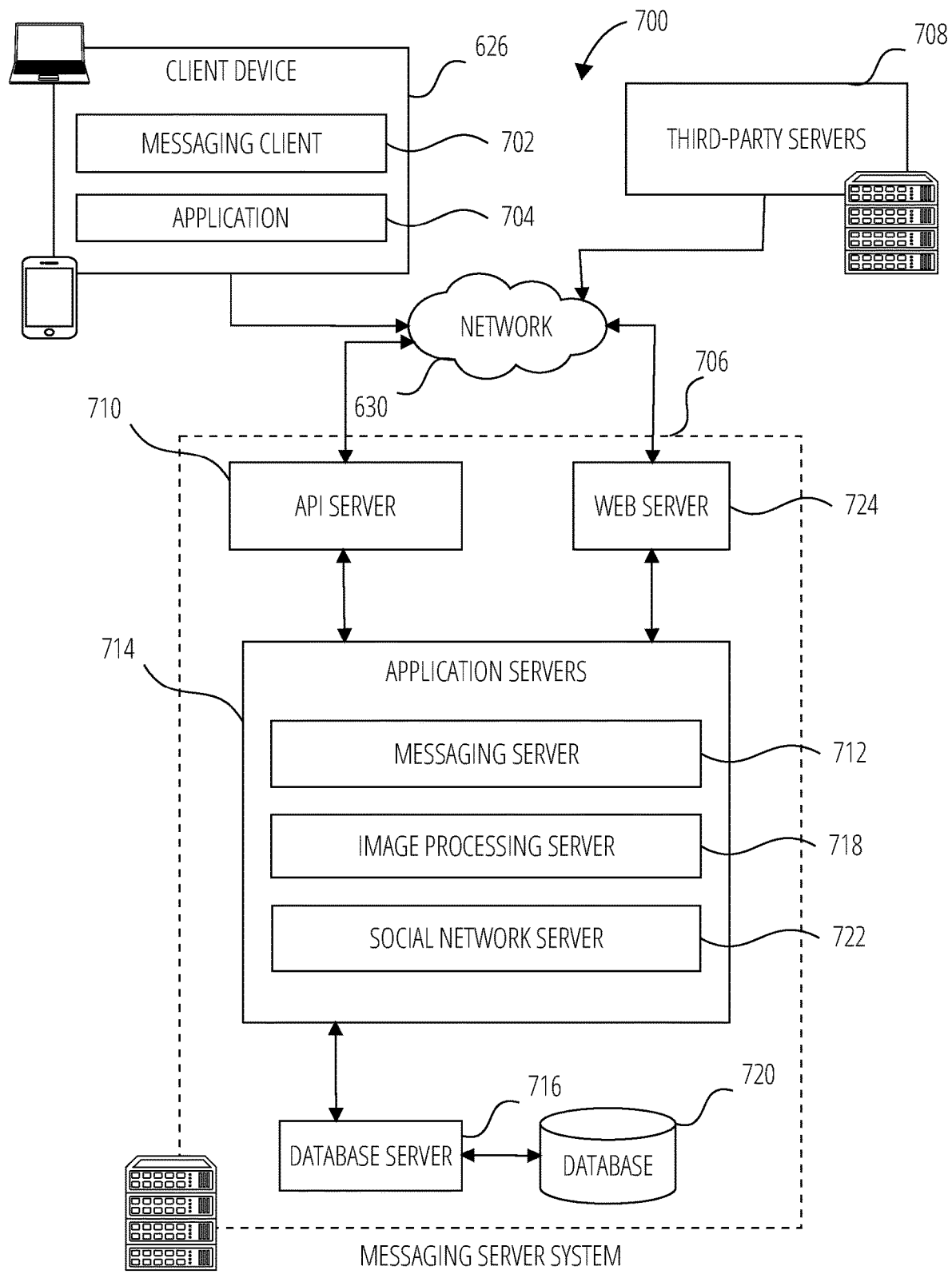
FIG. 7 is a diagrammatic representation of a networked environment in which the present disclosure may be deployed, in accordance with some examples.

FIG. 7 is a block diagram showing an example messaging system 700 for exchanging data (e.g., messages and associated content) over a network. The messaging system 700 includes multiple instances of a client device 626 which host a number of applications, including a messaging client 702 and other Applications 704. A messaging client 702 is communicatively coupled to other instances of the messaging client 702 (e.g., hosted on respective other client devices 626), a messaging server system 706 and third-party servers 708 via a network 630 (e.g., the Internet). A messaging client 702 can also communicate with locally-hosted Applications 704 using Application Program Interfaces (APIs).

A messaging client 702 is able to communicate and exchange data with other messaging clients 702 and with the messaging server system 706 via the network 630. The data exchanged between messaging clients 702, and between a messaging client 702 and the messaging server system 706, includes functions (e.g., commands to invoke functions) as well as payload data (e.g., text, audio, video or other multimedia data).

The messaging server system 706 provides server-side functionality via the network 630 to a particular messaging client 702. While some functions of the messaging system 700 are described herein as being performed by either a messaging client 702 or by the messaging server system 706, the location of some functionality either within the messaging client 702 or the messaging server system 706 may be a design choice. For example, it may be technically preferable to initially deploy some technology and functionality within the messaging server system 706 but to later migrate this technology and functionality to the messaging client 702 where a client device 626 has sufficient processing capacity.

The messaging server system 706 supports various services and operations that are provided to the messaging client 702. Such operations include transmitting data to, receiving data from, and processing data generated by the messaging client 702. This data may include message content, client device information, geolocation information, media augmentation and overlays, message content persistence conditions, social network information, and live event information, as examples. Data exchanges within the messaging system 700 are invoked and controlled through functions available via user interfaces (UIs) of the messaging client 702.

Turning now specifically to the messaging server system 706, an Application Program Interface (API) server 710 is coupled to, and provides a programmatic interface to, application servers 714. The application servers 714 are communicatively coupled to a database server 716, which facilitates access to a database 720 that stores data associated with messages processed by the application servers 714. Similarly, a web server 724 is coupled to the application servers 714 and provides web-based interfaces to the application servers 714. To this end, the web server 724 processes incoming network requests over the Hypertext Transfer Protocol (HTTP) and several other related protocols.

The Application Program Interface (API) server 710 receives and transmits message data (e.g., commands and message payloads) between the client device 626 and the application servers 714. Specifically, the Application Program Interface (API) server 710 provides a set of interfaces (e.g., routines and protocols) that can be called or queried by the messaging client 702 in order to invoke functionality of the application servers 714. The Application Program Interface (API) server 710 exposes various functions supported by the application servers 714, including account registration, login functionality, the sending of messages, via the application servers 714, from a particular messaging client 702 to another messaging client 702, the sending of media files (e.g., images or video) from a messaging client 702 to a messaging server 712, and for possible access by another messaging client 702, the settings of a collection of media data (e.g., story), the retrieval of a list of friends of a user of a client device 626, the retrieval of such collections, the retrieval of messages and content, the addition and deletion of entities (e.g., friends) to an entity graph (e.g., a social graph), the location of friends within a social graph, and opening an application event (e.g., relating to the messaging client 702).

The application servers 714 host a number of server applications and subsystems, including for example a messaging server 712, an image processing server 718, and a social network server 722. The messaging server 712 implements a number of message processing technologies and functions, particularly related to the aggregation and other processing of content (e.g., textual and multimedia content) included in messages received from multiple instances of the messaging client 702. As will be described in further detail, the text and media content from multiple sources may be aggregated into collections of content (e.g., called stories or galleries). These collections are then made available to the messaging client 702. Other processor and memory intensive processing of data may also be performed server-side by the messaging server 712, in view of the hardware requirements for such processing.

The application servers 714 also include an image processing server 718 that is dedicated to performing various image processing operations, typically with respect to images or video within the payload of a message sent from or received at the messaging server 712.

The social network server 722 supports various social networking functions and services and makes these functions and services available to the messaging server 712. To this end, the social network server 722 maintains and accesses an entity graph within the database 720. Examples of functions and services supported by the social network server 722 include the identification of other users of the messaging system 700 with which a particular user has relationships or is "following," and also the identification of other entities and interests of a particular user.

The messaging client 702 can notify a user of the client device 626, or other users related to such a user (e.g., "friends"), of activity taking place in shared or shareable sessions. For example, the messaging client 702 can provide participants in a conversation (e.g., a chat session) in the messaging client 702 with notifications relating to the current or recent use of a game by one or more members of a group of users. One or more users can be invited to join in an active session or to launch a new session. In some examples, shared sessions can provide a shared augmented reality experience in which multiple people can collaborate or participate.

A "carrier signal" refers to any intangible medium that is capable of storing, encoding, or carrying instructions for execution by the machine, and includes digital or analog communications signals or other intangible media to facilitate communication of such instructions. Instructions may be transmitted or received over a network using a transmission medium via a network interface device.

A "client device" refers to any machine that interfaces to a communications network to obtain resources from one or more server systems or other client devices. A client device may be, but is not limited to, a mobile phone, desktop computer, laptop, portable digital assistants (PDAs), smartphones, tablets, ultrabooks, netbooks, laptops, multi-processor systems, microprocessor-based or programmable consumer electronics, game consoles, set-top boxes, or any other communication device that a user may use to access a network.

A "communication network" refers to one or more portions of a network that may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network or a portion of a network may include a wireless or cellular network and the coupling may be a Code Division Multiple Access (CDMA) connection, a Global System for Mobile communications (GSM) connection, or other types of cellular or wireless coupling. In this example, the coupling may implement any of a variety of types of data transfer technology, such as Single Carrier Radio Transmission Technology (1xRTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long-range protocols, or other data transfer technology.

A "component" refers to a device, physical entity, or logic having boundaries defined by function or subroutine calls, branch points, APIs, or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions. Components may constitute either software components (e.g., code embodied on a machine-readable medium) or hardware components. A "hardware component" is a tangible unit capable of performing some operations and may be configured or arranged in a particular physical manner. In various examples, one or more computer systems (e.g., a standalone computer system, a client computer system, or a server computer system) or one or more hardware components of a computer system (e.g., a processor or a group of processors) may be configured by software (e.g., an application or application portion) as a hardware component that operates to perform some operations as described herein. A hardware component may also be implemented mechanically, electronically, or any suitable combination thereof. For example, a hardware component may include dedicated circuitry or logic that is permanently configured to perform some operations. A hardware component may be a special-purpose processor, such as a field-programmable gate array (FPGA) or an application specific integrated circuit (ASIC). A hardware component may also include programmable logic or circuitry that is temporarily configured by software to perform some operations. For example, a hardware component may include software executed by a general-purpose processor or other programmable processor. Once configured by such software, hardware components become specific machines (or specific components of a machine) tailored to perform the configured functions and are no longer general-purpose processors. It will be appreciated that the decision to implement a hardware component mechanically, in dedicated and permanently configured circuitry, or in temporarily configured circuitry (e.g., configured by software), may be driven by cost and time considerations. Accordingly, the phrase "hardware component" (or "hardware-implemented component") is to be understood to encompass a tangible entity, be that an entity that is physically constructed, permanently configured (e.g., hardwired), or temporarily configured (e.g., programmed) to operate in a particular manner or to perform some operations described herein. Considering examples in which hardware components are temporarily configured (e.g., programmed), the hardware components may not be configured or instantiated at any one instance in time. For example, where a hardware component comprises a general-purpose processor configured by software to become a special-purpose processor, the general-purpose processor may be configured as respectively different special-purpose processors (e.g., comprising different hardware components) at different times. Software accordingly configures a particular processor or processors, for example, to constitute a particular hardware component at one instance of time and to constitute a different hardware component at a different instance of time. Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses) between or among two or more of the hardware components. In examples in which multiple hardware components are configured or instantiated at different times, communications between such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output. Hardware components may also initiate communications with input or output devices, and can operate on a resource (e.g., a collection of information). The various operations of example methods described herein may be performed by one or more processors that are temporarily configured (e.g., by software) or permanently configured to perform the relevant operations. Whether temporarily or permanently configured, such processors may constitute processor-implemented components that operate to perform one or more operations or functions described herein. As used herein, "processor-implemented component" refers to a hardware component implemented using one or more processors. Similarly, the methods described herein may be partially processor-implemented, with a particular processor or processors being an example of hardware. For example, some of the operations of a method may be performed by one or more processors or processor-implemented components. Moreover, the one or more processors may also operate to support performance of the relevant operations in a "cloud computing" environment or as a "software as a service" (SaaS). For example, at some of the operations may be performed by a group of computers (as examples of machines including processors), with these operations being accessible via a network (e.g., the Internet) and via one or more appropriate interfaces (e.g., an API). The performance of some of the operations may be distributed among the processors, residing within a single machine as well as being deployed across a number of machines. In some examples, the processors or processor-implemented components may be located in a single geographic location (e.g., within a home environment, an office environment, or a server farm). In other examples, the processors or processor-implemented components may be distributed across a number of geographic locations.

A "computer-readable medium" refers to both non-transitory machine-storage media and transmission media. Thus, the terms include both storage devices/media and carrier waves/modulated data signals. The terms "machine-readable medium," "computer-readable medium" and "device-readable medium" mean the same thing and may be used interchangeably in this disclosure.

A "machine-storage medium" refers to a single or multiple storage devices and/or media (e.g., a centralized or distributed database, and/or associated caches and servers) that store executable instructions, routines and/or data. The term includes, but not be limited to, solid-state memories, and optical and magnetic media, including memory internal or external to processors. Specific examples of machine-storage media, computer-storage media and/or device-storage media include non-volatile memory, including by way of example semiconductor memory devices, e.g., erasable programmable read-only memory (EPROM), electrically erasable programmable read-only memory (EEPROM), FPGA, and flash memory devices; magnetic disks such as internal hard disks and removable disks; magneto-optical disks; and CD-ROM and DVD-ROM disks The terms "machine-storage medium," "device-storage medium," "computer-storage medium" mean the same thing and may be used interchangeably in this disclosure. The terms "machine-storage media," "computer-storage media," and "device-storage media" specifically exclude carrier waves, modulated data signals, and other such media, at some of which are covered under the term "signal medium."

A "processor" refers to any circuit or virtual circuit (a physical circuit emulated by logic executing on an actual processor) that manipulates data values according to control signals (e.g., "commands", "op codes", "machine code", and so forth) and which produces associated output signals that are applied to operate a machine. A processor may, for example, be a Central Processing Unit (CPU), a Reduced Instruction Set Computing (RISC) processor, a Complex Instruction Set Computing (CISC) processor, a Graphics Processing Unit (GPU), a Digital Signal Processor (DSP), an Application Specific Integrated Circuit (ASIC), a Radio-Frequency Integrated Circuit (RFIC) or any combination thereof. A processor may further be a multi-core processor having two or more independent processors (sometimes referred to as "cores") that may execute instructions contemporaneously.

A "signal medium" refers to any intangible medium that is capable of storing, encoding, or carrying the instructions for execution by a machine and includes digital or analog communications signals or other intangible media to facilitate communication of software or data. The term "signal medium" may be taken to include any form of a modulated data signal, carrier wave, and so forth. The term "modulated data signal" means a signal that has one or more of its characteristics set or changed in such a matter as to encode information in the signal. The terms "transmission medium" and "signal medium" mean the same thing and may be used interchangeably in this disclosure.

Changes and modifications may be made to the disclosed examples without departing from the scope of the present disclosure. These and other changes or modifications are intended to be included within the scope of the present disclosure, as expressed in the following claims.

What is claimed is:

1. A computer-implemented method comprising:
    displaying a virtual object in an Augmented Reality (AR) experience provided to a user by an AR system, the virtual object including first 3D coordinate data of a location of the virtual object in a real-world scene;
    determining a user wants to interact with the virtual object by performing Direct Manipulation of Virtual Object (DMVO) operations comprising:
        determining, using one or more cameras of the AR system, second 3D coordinate data of one or more nodes of a skeletal model of a hand of a user; and
        determining an overlap between the hand of the user and the virtual object from a perspective of the user using the first 3D coordinate data and the second 3D coordinate data;
    in response to determining the overlap, rotating the virtual object by performing gesture recognition operations comprising:
        determining a current rotation value of a wrist joint of the hand of the user based on recognizing a gesture of rotation using the one more cameras, the gesture of rotation not involving DMVO operations on the virtual object; and
        generating an updated rotation value for the virtual object based on the current rotation value of the wrist joint, a default rotation value of the virtual object, and a difference between the current rotation value of the wrist joint and a default rotation value for the wrist joint; and
    redisplaying the virtual object based on the updated rotation value.

2. The computer-implemented method of claim 1, further comprising:
    determining that the hand of the user no longer overlaps the virtual object; and
    based on determining that the hand of the user no longer overlaps the virtual object, ending interaction of the user with the virtual object.

3. The computer-implemented method of claim 1, wherein operations of determining an overlap between the hand of the user and the virtual object further comprise:
    capturing, using the one or more cameras, hand-tracking video frame data of the hand of the user;
    generating hand-tracking data based on the hand-tracking video frame data; and
    determining the overlap between the hand of the user and the virtual object using the hand-tracking data.

4. The computer-implemented method of claim 1, wherein operations of determining an overlap between the hand of the user and the virtual object further comprise:

capturing, using the one or more cameras, hand-tracking video frame data of the hand of the user; and determining the overlap between the hand of the user and the virtual object based on the hand-tracking video frame data using one or more computer vision methodologies.

5. The computer-implemented method of claim 1, wherein operations of determining the current rotation value of the wrist joint of the hand of the user further comprise:

capturing, using the one or more cameras, hand-tracking video frame data of the hand of the user; and determining the current rotation value of the wrist joint of the hand of the user based on the hand-tracking video frame data and a wrist rotation model generated using machine learning methodologies.

6. The computer-implemented method of claim 1, wherein the AR system comprises a head-worn apparatus.

7. A computing apparatus comprising:

one or more processors; and a memory storing instructions that, when executed by the one or more processors, cause the computing apparatus to perform operations comprising:

displaying a virtual object in an AR experience provided to a user by an AR system, the virtual object including first 3D coordinate data of a location of the virtual object in a real-world scene;

determining a user wants to interact with the virtual object by performing Direct Manipulation of Virtual Object (DMVO) operations comprising:

determining, using one or more cameras of the AR system, second 3D coordinate data of one or more nodes of a skeletal model of a hand of a user; and determining an overlap between the hand of the user and the virtual object from a perspective of the user using the first 3D coordinate data and the second 3D coordinate data;

in response to determining the overlap, rotating the virtual object by performing gesture recognition operations comprising:

determining a current rotation value of a wrist joint of the hand of the user based on recognizing a gesture of rotation using the one more cameras, the gesture of rotation not involving DMVO operations on the virtual object; and generating an updated rotation value for the virtual object based on the current rotation value of the wrist joint, a default rotation value of the virtual object, and a difference between the current rotation value of the wrist joint and a default rotation value for the wrist joint; and redisplaying the virtual object based on the updated rotation value.

8. The computing apparatus of claim 7, wherein the operations further comprise:

determining that the hand of the user no longer overlaps the virtual object; and based on determining that the hand of the user no longer overlaps the virtual object, ending interaction of the user with the virtual object.

9. The computing apparatus of claim 7, wherein operations of determining an overlap between the hand of the user and the virtual object further comprise:

capturing, using the one or more cameras, hand-tracking video frame data of the hand of the user;

generating hand-tracking data based on the hand-tracking video frame data; and determining the overlap between the hand of the user and the virtual object using the hand-tracking data.

10. The computing apparatus of claim 7, wherein operations of determining an overlap between the hand of the user and the virtual object further comprise:

capturing, using the one or more cameras, hand-tracking video frame data of the hand of the user; and determining the overlap between the hand of the user and the virtual object based on the hand-tracking video frame data using one or more computer vision methodologies.

11. The computing apparatus of claim 7, wherein operations of determining the current rotation value of the wrist joint of the hand of the user further comprise:

capturing, using the one or more cameras, hand-tracking video frame data of the hand of the user; and determining the current rotation value of the wrist joint of the hand of the user based on the hand-tracking video frame data and a wrist rotation model generated using machine learning methodologies.

12. The computing apparatus of claim 7, wherein the AR system comprises a head-worn apparatus.

13. A non-transitory computer-readable storage medium including instructions that, when executed by a computer, cause the computer to perform operations comprising:

displaying a virtual object in an AR experience provided to a user by an AR system, the virtual object including first 3D coordinate data of a location of the virtual object in a real-world scene;

determining a user wants to interact with the virtual object by performing Direct Manipulation of Virtual Object (DMVO) operations comprising:

determining, using one or more cameras of the AR system, second 3D coordinate data of one or more nodes of a skeletal model of a hand of a user; and determining an overlap between the hand of the user and the virtual object from a perspective of the user using the first 3D coordinate data and the second 3D coordinate data;

in response to determining the overlap, rotating the virtual object by performing gesture recognition operations comprising:

determining a current rotation value of a wrist joint of the hand of the user based on recognizing a gesture of rotation using the one more cameras, the gesture of rotation not involving DMVO operations on the virtual object; and generating an updated rotation value for the virtual object based on the current rotation value of the wrist joint, a default rotation value of the virtual object, and a difference between the current rotation value of the wrist joint and a default rotation value for the wrist joint; and redisplaying the virtual object based on the updated rotation value.

14. The non-transitory computer-readable storage medium of claim 13, wherein the operations further comprise:

determining that the hand of the user no longer overlaps the virtual object; and based on determining that the hand of the user no longer overlaps the virtual object, ending interaction of the user with the virtual object.

15. The non-transitory computer-readable storage medium of claim 13, wherein operations of determining an overlap between the hand of the user and the virtual object further comprise:

capturing, using the one or more cameras, hand-tracking video frame data of the hand of the user;
generating hand-tracking data based on the hand-tracking video frame data; and
determining the overlap between the hand of the user and the virtual object using the hand-tracking data.

16. The non-transitory computer-readable storage medium of claim 13, wherein operations of determining an overlap between the hand of the user and the virtual object further comprise:
capturing, using the one or more cameras, hand-tracking video frame data of the hand of the user; and
determining the overlap between the hand of the user and the virtual object based on the hand-tracking video frame data using one or more computer vision methodologies.

17. The non-transitory computer-readable storage medium of claim 13, wherein the AR system comprises a head-worn apparatus.

* * * * *